(12) United States Patent
Andreasen

(10) Patent No.: US 7,788,383 B2
(45) Date of Patent: Aug. 31, 2010

(54) COMMUNICATING A SELECTION OF A POTENTIAL CONFIGURATION

(75) Inventor: Flemming Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 363 days.

(21) Appl. No.: 11/929,102

(22) Filed: Oct. 30, 2007

(65) Prior Publication Data
US 2009/0113067 A1 Apr. 30, 2009

(51) Int. Cl.
*G06F 15/16* (2006.01)

(52) U.S. Cl. .................. 709/227; 709/228; 709/230; 709/231

(58) Field of Classification Search .......... 709/227, 709/228, 230, 231
See application file for complete search history.

(56) References Cited

U.S. PATENT DOCUMENTS

| 7,227,865 | B2 * | 6/2007 | Shaheen et al. | 370/395.21 |
|---|---|---|---|---|
| 7,467,220 | B2 * | 12/2008 | del Val et al. | 709/231 |
| 7,468,983 | B2 * | 12/2008 | Requena et al. | 370/401 |
| 7,512,118 | B1 * | 3/2009 | Stephens | 370/352 |
| 2005/0117580 | A1 * | 6/2005 | del Val et al. | 370/395.2 |
| 2007/0078986 | A1 * | 4/2007 | Ethier et al. | 709/227 |
| 2008/0080568 | A1 * | 4/2008 | Hughes et al. | 370/519 |
| 2009/0262915 | A1 * | 10/2009 | Wu et al. | 379/207.16 |
| 2009/0274146 | A1 * | 11/2009 | Zhu | 370/352 |
| 2009/0290573 | A1 * | 11/2009 | Belling et al. | 370/352 |

OTHER PUBLICATIONS

International Search Report for Application No. PCT/US2008/080872 dated Jul. 28, 2009.
U.S. Appl. No. 11/668,334, filed Jan. 29, 2007.
Camarillo, et al., Integration of Resource Management and Session Initiation Protocol (SIP), Oct. 2002, http://www.apps.ietf.org/rfc/rfc3312.html.
Rosenberg, et al., An Offer/Answer Model with the Session Description Protocol (SDP), Jun. 2002, http://www.ietf.org/rfc/rfc3264.txt.
Rosenberg, Interactive Connectivity Establishment (ICE): A Methodology for Network Address Translator (NAT) Traversal for Offer/Answer Protocols, Jan. 16, 2007, http://tools.ietf.org/html/draft-ietf-mmusic-ice-13.
Andreasen, SDP Capability Negotiation, Jan. 28, 2007, http://tools.ietf.org/html/draft-ietf-mmusic-sdp-capability-negotiation-01.
Kaplan, et al., Session Description Protocol (SDP) Offer/Answer Negotiation for Best-Effort Secure Real-Time Transport Protocol, Oct. 2006, http://209.85.165.104/u/ietf?q=cache:QKPISDHO6rYJ:tools.ietf.org/w . . . .

\* cited by examiner

*Primary Examiner*—Nathan Flynn
*Assistant Examiner*—Mohamed Wasel
(74) *Attorney, Agent, or Firm*—Tucker Ellis & West LLP

(57) ABSTRACT

A first streaming media device, such as a Voice over Internet Protocol (VoIP) phone initiates a communication session with a second streaming media device. An offer is sent to the second streaming media device comprising a plurality of potential configurations. The second device selects one of the plurality of configurations and communicates the selection to the first device during an Interactive Connectivity Establishment (ICE) connectivity checks.

16 Claims, 3 Drawing Sheets

COMMUNICATING A SELECTION OF A POTENTIAL CONFIGURATION

TECHNICAL FIELD

This application generally relates to streaming media communications such as Voice over Internet Protocol (VoIP) communications.

BACKGROUND

Session Description Protocol (SDP) Capability Negotiation extends Session Description Protocol with capability indication and negotiation capabilities when used with the offer/answer procedures defined in (Request for Comment) RFC 3264. SDP extensions are defined that allow for potential configurations to be included in the offer, in addition to the actual configuration that is offered by the native SDP capabilities and associated RFC 3264. The actual configuration is what the offerer is committed to using when generating the offer; however, a potential configuration may be selected by the answerer instead. Furthermore, the answerer may generate media based on the potential configuration, which may be sent to the offerer prior to the offerer receiving the answer, which can create an unfortunate race condition. When such media is received by the offerer, the offerer may not be able to process it correctly until the offerer actually receives the answer, which may lead to lost media or erroneous rendering of media and hence suboptimal behavior.

BRIEF DESCRIPTION OF THE DRAWINGS

The accompanying drawings incorporated herein and forming a part of the specification, illustrate examples of the present invention, and together with the description serve to explain the principles of the invention.

DESCRIPTION OF EXAMPLE EMBODIMENTS

Overview of Example Embodiments

Figure 1:
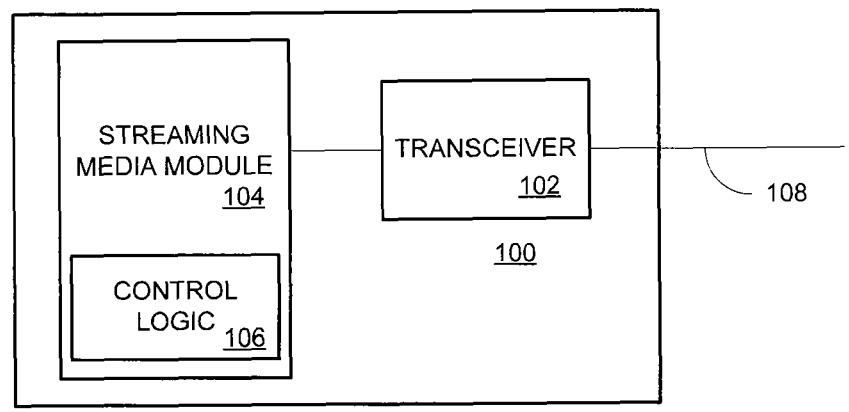
FIG. 1 illustrates an example of a streaming media device configured in accordance with an example embodiment.

The following presents a simplified summary of the example embodiments in order to provide a basic understanding of some aspects of the example embodiments. This summary is not an extensive overview of the example embodiments. It is intended to neither identify key or critical elements of the invention nor delineate the scope of the invention. Its sole purpose is to present some concepts of the example embodiments in a simplified form as a prelude to the more detailed description that is presented later.

In accordance with an example embodiment, there is disclosed herein, an apparatus comprising a transceiver configured to be coupled to a network and a streaming media client in data communication with the transceiver. The streaming media client is configured to send a connection request to communicate with an endpoint coupled to the network through the transceiver. The connection request comprises a plurality of potential configurations. The streaming media client is further configured to perform a connectivity check with the endpoint through the transceiver. The streaming media client is configured to acquire data representative of a selected configuration from the plurality of potential configurations during the connectivity check.

In accordance with an example embodiment, there is disclosed herein an apparatus comprising a transceiver configured to be coupled to a network and a streaming media module in data communication with the transceiver. The streaming media module is configured to receive a connection request from a device coupled to the network via the transceiver. The connection request comprises a plurality of potential configurations. The streaming media module is configured to select one of the plurality of configurations for communicating with the device. The streaming media module is configured to perform a connectivity check with the device, the streaming media module sending data representative of the selected configuration to the device during the connectivity check.

In an example embodiment, disclosed herein is a method comprising gathering addresses, prioritizing addresses, and sending an offer to initiate a streaming media session. The offer comprises a plurality of potential configurations. The method further comprises generating address pairs for the streaming media session, performing connectivity checks with the address pairs and receiving a selected configuration selected from the plurality of potential configurations for the streaming media session as part of the connectivity checks. The selected configuration is received while performing the connectivity checks.

In accordance with an example embodiment, disclosed herein is a method, comprising receiving a connection request from a device, the connection request comprising a plurality of potential configurations. One of the plurality of configurations is selected for communicating with the device. A connectivity check with the device is performed, the performing a connectivity check comprises sending data representative of the selected configuration to the device during the connectivity check.

DETAILED DESCRIPTION OF EXAMPLE EMBODIMENTS

This description provides examples not intended to limit the scope of the invention, as claimed. The figures generally indicate the features of the examples, where it is understood and appreciated that like reference numerals are used to refer to like elements.

In an example embodiment, a pair of devices (e.g. endpoints or agents) coupled to a network establish a streaming media communication. One of the devices initiates the communication (e.g. for a VoIP stream it may send an INVITE message to the other device) and communicates an offer to the other device. The other device responds with an answer and a session is established for the streaming media. One or more of the devices may be coupled to the network through a Network Address Translator (NAT), which may complicate establishing the session between the devices.

STUN (Simple Traversal of UDP (User Datagram Protocol) through NATs (Network Address Translators)) is a network protocol allowing a client behind a NAT (or multiple NATs) to find out its public address, and the internet side port associated by the NAT with a particular local port. This information is used to set up UDP communication between two hosts, one or both of which are behind NATs. The protocol is defined in RFC 3489.

Traversal Using Relay NAT (TURN) is a protocol that allows for an element behind a NAT or firewall to receive incoming data over TCP or UDP connections. It is useful for elements behind symmetric NATs or firewalls, when such elements wish to be on the receiving end of a connection to a single peer. TURN does not allow for users to run servers on well known ports if they are behind a NAT; it supports the connection of a user behind a NAT to only a single peer. In that regard, its role is to provide the same security functions provided by symmetric NATs and firewalls, but to turn the tables so that the element on the inside can be on both sending and the receiving end, rather than the sending end only, of a connection that is requested by the client.

Although TURN will almost always provide connectivity to a client, it may be desirable to connect using other mechanisms (such as STUN or direct connectivity) when possible. The Interactive Connectivity Establishment (ICE) methodology can be used to discover the optimal means of connectivity. ICE provides a mechanism for NAT traversal, using various techniques. For example, it can be useful to allow Session Initiation Protocol (SIP)-based VoIP clients to successfully traverse the variety of NATs and firewalls that may exist between a remote user and a network.

In ICE, the endpoints of a streaming media are referred to as 'agents.' Each agent has a variety of candidate transport addresses (a combination of IP address and port) it can use to communicate with the other agent. Potentially, any transport address may work; however, in practice, many combinations will not work. ICE discovers which pair (or pairs) of addresses will work. An agent employing ICE gathers candidate addresses. ICE may employ STUN to obtain additional candidate addresses. Once an agent has gathered all its candidate transport addresses, the candidate transport addresses are prioritized. The candidate transport addresses for the agents are paired. To determine which pairs work, a series of checks are performed. For example, a STUN transaction can be run for each candidate pair.

In an example embodiment, Potential configurations provided in an offer contain a preference indicator followed by a set of parameters to indicate the capabilities that constitute the potential configuration. This is illustrated by the following example:

a=pcfg:1 t=3|4 a=1
a=pcfg:8 t=1|2

Interactive Connectivity Establishment (ICE) sends STUN messages between the two endpoints to verify connectivity. The STUN message exchange occurs based on information provided in "candidate" attributes provided in the offer (and answer). An example embodiment described herein extends ICE to not only perform connectivity checks, but to also indicate which of the potential configurations from a particular offer was selected. When the answerer sends a STUN check to the offerer during ICE processing, the STUN message is extended to indicate the selected potential configuration.

Extending the STUN message can be done in several ways, including but not limited to:

1) Define a STUN attribute that contains the selected potential configuration values "as is" (e.g. as a text-string), and include it with the STUN message for the ICE check;

2) Require the preference for each potential configuration in a media stream to be unique and include the preference as a reference; and 3) Define an extension to the potential configuration attribute that contains a unique handle for each potential configuration.

Potential configurations and the capabilities they reference are only valid within the scope of a particular offer/answer exchanges. In order to ensure synchronization between the STUN messages indicating the selected potential configuration and the offer/answer exchange in question, the following can be done:

1) The STUN message can include the <sess-version> part of the "o=" field in the SDP (since it's required to increase whenever the session data is modified, as would be the case for a new Offer/Answer exchange with different information);

2) The candidate attribute can use different ice-pwd and/or ice-ufrag values for each new offer, since those will be included in the resulting STUN messages and hence can be used to correlate with a particular offer (as described in ICE).

Note that although SDP Capability Negotiation and ICE have been formally defined in the context of SIP (offer/answer), the principles of both and the example embodiments described herein can be applied to other VoIP (and similar) signaling protocols as well (e.g. MGCP, Megaco/H.248).

Referring now to FIG. 1, there is illustrated an apparatus 100 suitably adapted to be configured in accordance with an example embodiment. Apparatus 100 comprises a transceiver 102 and a streaming media module 104.

Transceiver 102 is suitably a transceiver capable of performing data communication with a network. Transceiver may be configured to wired or wireless communication. Transceiver 102 is coupled to an associated network via link 108. In an example embodiment where transceiver 102 is coupled to a wired network, link 108 may be any suitable wired communications link, for example link 108 can be a cable such as twisted pair, coaxial or fiber optic. In an example embodiment where transceiver 102 is coupled to a wireless network, link 108 is suitably an antenna appropriate for the type of wireless communication (e.g. radio frequency "RF", infra red "IR", etc.) available from the network.

Streaming media module 104 is in data communication with the transceiver 102. Streaming media module 104 is suitably configured to send and/or receive streaming media from the network through transceiver 102. Streaming media module 104 is suitably adaptable to be configured as a streaming media client or a streaming media server. Control logic 106 processes the streaming media packets sent and/or received by streaming media module 104. "Logic", as used herein, includes but is not limited to hardware, firmware, software and/or combinations of each to perform a function (s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

For example, apparatus 100 can be configured to function as a VoIP telephone, capable of sending and receiving audio and/or visual streaming media. Data packets are received by transceiver 102 and forwarded to streaming media module 104 for processing. Control logic 106 is suitably adapted for outputting the received streaming media (e.g. audio and/or visual). Audio and/or visual signals input into device 100 are processed by streaming media module 104 and sent by transceiver 102 via link 108 onto the associated network to the intended recipient.

In an example embodiment, streaming media module 104 is configured to function as a client requesting to initiate a streaming media connection with a server (e.g. a VoIP telephone call). The client may use a signaling protocol such as Session Initiation Protocol "SIP" (RFC 3261, June 2002) compatible protocol to as request the connection to another device (e.g. an 'endpoint' or 'agent') on the network. The signaling protocol may support Session Description Protocol "SDP" (RFC 4566, July 2006) compatible protocol to include an offer (see for example RFC 3264, June 2002), which can support SDP Capability Negotiation (see e.g. SDP Capability Negotiation, draft-ietf-mmusic-sdp-capability-negotiation-06.txt available from the Internet Engineering Task Force "IETF", Jul. 8, 2007) that comprises a plurality of potential configurations. The streaming media module (client) 104 is configured to perform a connectivity check with the device through transceiver 102. For example, streaming media module may support Internet Connectivity Establishment "ICE" (see Interactive Connectivity Establishment (ICE): A Methodology for Network Address Translator (NAT) Transversal for Offer/Answer Protocols, draft-ietf-mmusic-ice-17, dated Jul. 9, 2007, available from the IETF). The streaming media module (client) 104 is configured to acquire data representative of a selected configuration from the plurality of potential configurations during the connectivity check.

In an example embodiment, the connectivity check is a Simple Traversal of User Datagram Protocol through Network Address Translation (STUN) check. The STUN check may be performed during Interactive Connectivity Establishment (ICE) processing.

There are numerous ways that streaming media module 104 can acquire the data representative of the selected configuration from the connectivity check. For example, the plurality of potential configurations and selected configuration can be predefined STUN attributes. As another example, each of the plurality of potential configurations comprises a unique identifier. In an example embodiment where each potential configuration receives a unique handle, alternative configurations would be converted, for example potential configurations such as a=pcfg:1 t=3|4 a=1 and a=pcfg:8 t=1|2 would be converted to 1) a=pcfg:1, t=3, a=1; 2) a=pfcg:1 t=4, a=1; 3) a=pfcg:8 t=1; and 4) a=pcfg:8, t=2. The response would have a predefined field for indicating the number (e.g. 1, 2, 3 or 4) of the selected configuration. In an example embodiment, a predefined ordering scheme can be used for determining the response. For example, the scheme can start top line, one line at a time and alternative configurations from left to right. So potential configurations a=pcfg:1 t=3|4 a=1 and a=pcfg:8 t=1|2 can be interpreted using the predefined ordering system to an offer with four potential configurations as follows: 1) a=pcfg:1, t=3, a=1; 2) a=pfcg:1 t=4, a=1; 3) a=pfcg:8 t=1; and 4) a=pcfg:8, t=2. The endpoint can merely return the number (e.g. 1, 2, 3 or 4 from the aforementioned example) to indicate the selected configuration.

Figure 2:
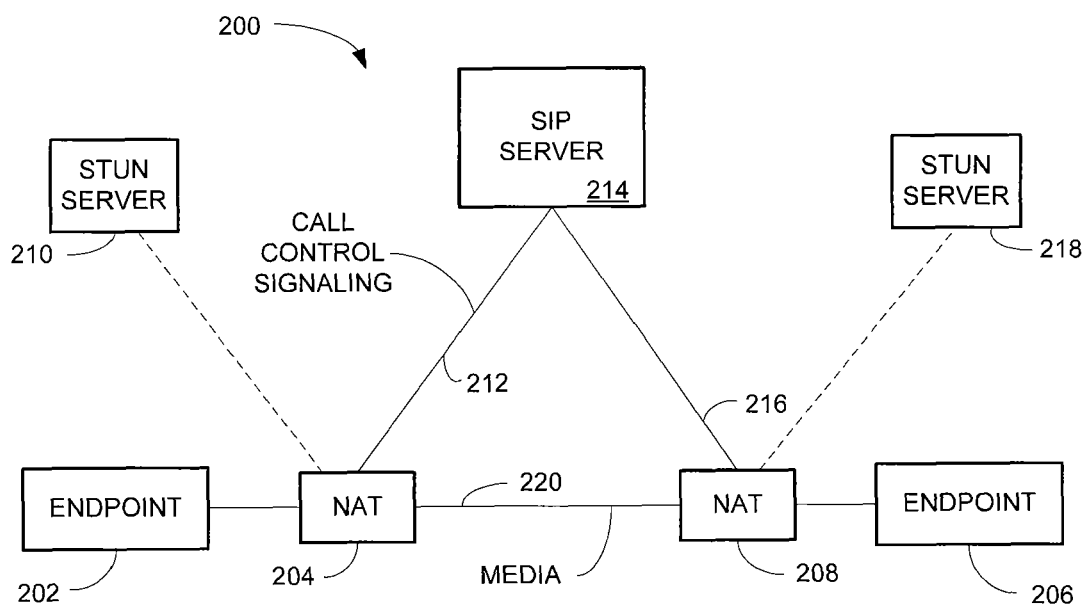
FIG. 2 illustrates an example embodiment of a network supporting streaming communications.

In an example embodiment, apparatus 100 and/or the device (endpoint) may be behind a network address translator "NAT" (see e.g. FIG. 2). In order to facilitate streaming communications, apparatus 100 and/or the device apparatus 100 is requesting to initiate a streaming communication session and may be configured to acquire a public IP address from a STUN server. If apparatus 100 is communicating to the network through a NAT, the connection request may suitably comprise one or more IP addresses acquired from a STUN server.

In an example embodiment, the connection request (e.g. offer) and data representative of a selected configuration (e.g. answer) may suitably comprise data to enable correlation of the answer to the offer. For example, in an example embodiment, the offer and the answer comprises a session version (e.g. the o=field of an SDP compatible message) for the selected configuration. Streaming media module 104 is further configured to correlate the session version in the connection request with the session version for the selected configuration. In an example embodiment, the data to enable correlation may include a session level attributes such as an ICE u-frag attribute and/or an ICE-pwd attribute.

In an example embodiment, the plurality of potential configurations contain data representative of one of (or more) a group consisting of Internet Protocol (IP) address, security algorithm, keying material, transport protocol, media format, media format parameters and a session identifier in any combination. For example the potential configurations may contain IP addresses. In another example embodiment, the potential configurations may include IP addresses and transport protocols. In another example embodiment, the potential configurations may include transport protocols, media formats, and media format parameters. In still yet another example embodiment, the potential configurations may include IP addresses, security algorithm, keying material, transport protocol and a session identifier. Any combination of potential configuration parameters, including, but not limited to those listed above, may be used.

In an example embodiment, apparatus 100 is also suitably adapted to be configured as a recipient (e.g. a server) of a request for a streaming media session, such as a VoIP telephone call from a device. For example, a connection request may be received via transceiver 102 by streaming media module (server) 104. The connection request may suitably comprise a plurality of potential configurations. Streaming media module 104 is configured to select one of the plurality of configurations for communicating with the device. Streaming media module 104 is configured to perform a connectivity check with the device requesting the session, streaming media module 104 sends the data representative of the selected configuration to the device during the connectivity check.

In an example embodiment, the connection request is received from a connection server; streaming media module 104 is further configured to send an answer to the connection request to the connection server. In an example embodiment, the connection server is a Session Initiation Protocol (SIP) compatible server. In an example embodiment, the plurality of potential configurations are received in a session description protocol (SDP) message. Streaming media module 104 determines from the SDP message that the device is Interactive Connectivity Establishment protocol compatible and the data representative of a selected configuration is sent during a STUN compatible connectivity check.

In an example embodiment, the connection request (e.g. offer) and data representative of a selected configuration (e.g. answer) may suitably comprise data to enable correlation of the answer to the offer. For example, in an example embodiment, the offer and the answer comprises a session version (e.g. the o=field of an SDP compatible message) for the selected configuration. As another example, the data to enable correlation may include session level attributes such as an ICE u-frag attribute and/or an ICE-pwd attribute.

FIG. 2 illustrates an example of a network 200 suitably configured to implement an example embodiment. An endpoint 202 is coupled to a network via NAT 204. Endpoint 206 is coupled to the network via NAT 208. In an example embodiment, apparatus 100 is used to implement endpoints 202, 206.

As an example, endpoint 202 desires to initiate a streaming media session (e.g. a VoIP telephone call) with endpoint 206 using ICE. Endpoint 202 gathers addresses it has available for connecting. Because endpoint 202 is coupled to the network through NAT 204, endpoint 202 communicates with STUN server 210 to acquire its public IP address. Endpoint 202 then sends a signal (e.g. an INVITE) to initiate the session. The signal is routed from NAT 204 via connection 212 to SIP server 214. SIP server 214 resolves the location of endpoint 206 and sends a signal (e.g. an INVITE) to NAT 208 on connection 216 to communicate with endpoint 206. The signal is forwarded to endpoint 206 by NAT 208. Endpoint 206 determines that endpoint 202 is ICE compatible. As endpoint 206 is also ICE compatible, it also gathers addresses. Endpoint 206 utilizes STUN server 218 to acquire its public IP address. Although as illustrated endpoint 202 uses STUN server 210 and endpoint 206 uses STUN server 218, in accordance with particular embodiments endpoints 202 and 206 may utilize the same STUN server. Endpoints 202 and 206 may also gather addresses at different points (e.g. before a streaming media session is being set up).

Endpoint 206 provides endpoint 202 with its own list of candidate connection addresses. Endpoints 202, 206 generate connection pairs and begin testing pairs. Endpoints 202, 206 begin performing connectivity tests. The tests may continue until a successful connectivity test, or additional tests may be performed after a successful connectivity test. In an example embodiment, the connectivity tests are STUN message exchanges between endpoints 202, 206, which would also pass through NATs 204, 208 in the illustrated example. During the connectivity tests, endpoint 206 can indicate the selected configuration. Media is then exchanged between endpoints 202, 206 via NATs 204, 208 as indicated by connection 220. After the connectivity tests have completed, endpoint 206 sends an answer to the offerer (endpoint 202) via connections 216, 212. Because endpoint 206 has already sent data representative of the selected configuration during the connectivity tests, endpoints 202, 206 may begin exchanging media prior to endpoint 202 receiving the answer.

Figure 3:
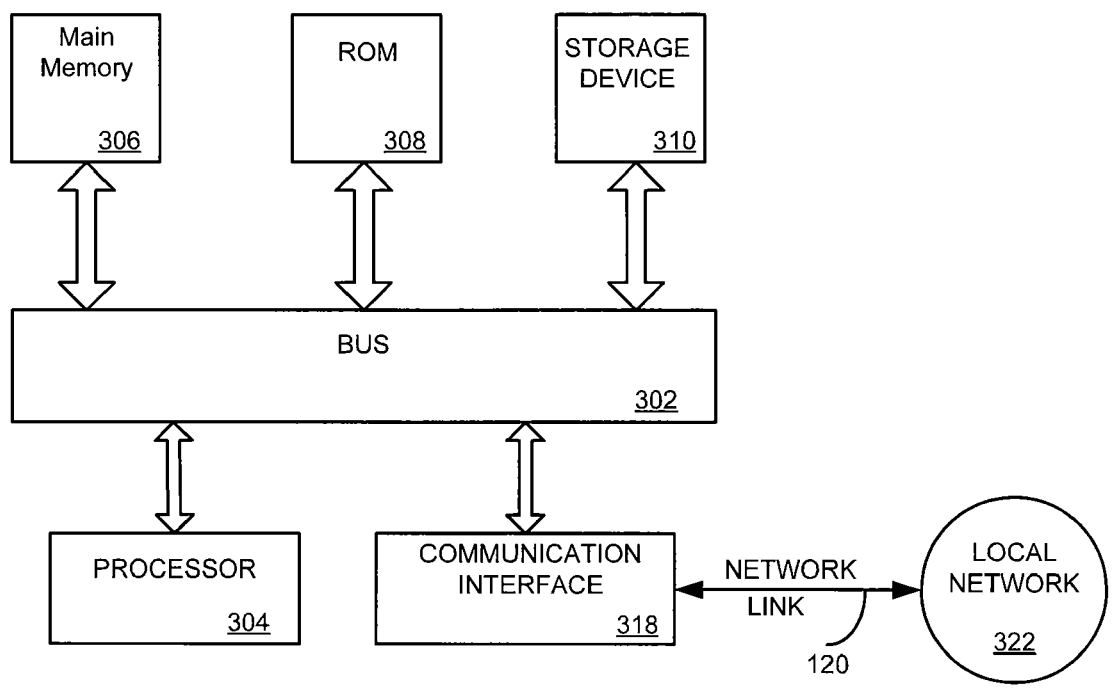
FIG. 3 illustrates an example of a computer system capable of implementing an example embodiment.

FIG. 3 is a block diagram that illustrates a computer system 300 upon which an example embodiment may be implemented. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for communicating a selection from potential configurations. According to an example embodiment, communicating a configuration selected from potential configurations is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information. Network link 320 typically provides data communication through one or more networks to other data devices. For example, network link 320 may provide a connection through local network 322 to a host computer or to data equipment operated by an Internet Service Provider (ISP). An ISP provides data communications through the worldwide packet data communication network, now commonly referred to as the "Internet". Local network 322 and uses electrical, electromagnetic, or optical signals that carry the digital data to and from computer system 300, are exemplary forms of carrier waves transporting the information.

Computer system 300 can send messages and receive data, including program codes, through network link 320, and communication interface 318. For example, a server might transmit a requested code for an application program through local network 322 and communication interface 318. In accordance with an example embodiment, one such downloaded application provides for communicating a selection from potential configurations as described herein.

The received code may be executed by processor 304 as it is received, and/or stored in storage device 310, or other non-volatile storage for later execution. In this manner, computer system 300 may obtain application code in the form of a carrier wave.

Figure 4:
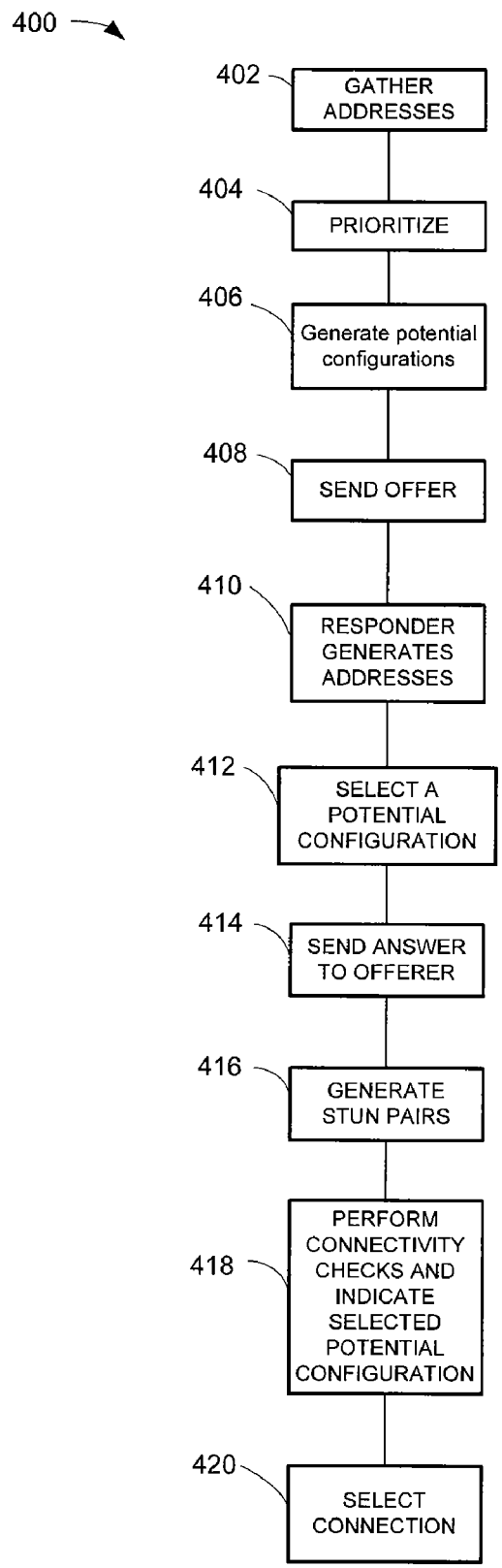
FIG. 4 is a block diagram of an example methodology.

In view of the foregoing structural and functional features described above, a methodology in accordance with an example embodiment will be better appreciated with reference to FIG. 4. While, for purposes of simplicity of explanation, the methodology of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. Embodiments of the present invention are suitably adapted to implement the methodology in hardware, software, or a combination thereof.

FIG. 4 illustrates an example of using an ICE compatible protocol for communicating the selection of a potential configuration. At 402, a first endpoint desiring to initiate a streaming media session gathers addresses for communicating with a second endpoint. If the first endpoint employs a NAT, the first endpoint may communicate with a STUN server to acquire its public IP address. The gathered IP addresses may suitably comprise an IP address and a port. At 404, the first endpoint prioritizes the addresses that were gathered. Any suitable prioritizing algorithm may be employed. For example, the ICE draft gives an example of a suitable prioritization algorithm. At 406, the first endpoint generates potential configurations. The first endpoint may generate a number of potential configurations. Optionally, a handle (e.g. a pointer) may be associated with each of the potential configurations.

At 408, the first endpoint sends an offer to the second endpoint. The offer includes the potential configurations generated at 406. In an example embodiment, the offer is communicated using a SDP capability compatible protocol. For example, the offer may be sent as part of an INVITE message sent to a signaling (e.g. SIP) server.

At 410, the second endpoint (e.g. responder) generates addresses for communicating with the first endpoint. If the second endpoint is employing a NAT, it may employ a STUN server (either the same one used by the first endpoint or a second STUN server) to acquire a public IP address.

At 412, a potential configuration from the offer is selected by the responder (answerer). The selected potential configuration is selected from the potential configurations generated at 406 and communicated in 408. At 414, an answer is sent from the second endpoint (responder) to the first endpoint (offerer). The answer includes the addresses generated at 410.

At 416, both endpoints generate STUN pairs. The STUN pairs comprise addresses for the first endpoint paired with addresses of the second endpoint. The STUN pairs may also be prioritized.

At 418, connectivity checks for the STUN pairs are performed. If the STUN pairs are prioritized, the connectivity checks are sent in priority order. Each endpoint sends a connectivity check and waits for a response. If a working pair exits, it will be found, no matter which order the connectivity checks are performed. In an example embodiment, the first endpoint sends a STUN request to the second endpoint and waits for a STUN response from the second endpoint. The second endpoint also sends a STUN request to the first endpoint and waits for a response from the first endpoint. Thus, in order to communicate which of the potential configurations was selected, the second endpoint may include selected configuration information in either the STUN response sent to the first endpoint, in the STUN request sent to the first endpoint, or both. The data for the selected configuration may be sent in any variety of ways, including but not limited to using a predefined STUN attribute, selecting an identifier for the potential configuration, or generating an identifier for the potential configuration using a predefined algorithm for interpreting alternative configurations.

At 420, the connection for the streaming media session is selected. In an example embodiment that uses prioritized lists, the first configuration that produces a working pair is selected. In an example embodiment, additional configurations are tested. It may be desirable to test additional configurations to determine the best connection based on criteria such as packet loss, latency, and/or any other characteristic.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a transceiver configured to be coupled to a network; and
a streaming media client in data communication with the transceiver;
wherein the streaming media client is configured to send a connection request to communicate with an endpoint coupled to the network through the transceiver, the connection request comprising a plurality of potential configurations; and
the streaming media client is configured to perform a connectivity check with the endpoint through the transceiver, the streaming media client is configured to acquire data representative of a selected configuration from the plurality of potential configurations during the connectivity check;
wherein the connectivity request comprises a username fragment and a message integrity check;
wherein the data representative of the selected configuration includes an Interactive Connectivity Exchange "ICE" u-frag attribute and an ICE-pwd attribute; and
wherein the streaming media client is further configured to correlate an ICE u-frag attribute and an ICE-pwd attribute in the data representative of the selected configuration with the ICE u-frag attribute and an ICE-pwd attribute in the connectivity request.

2. The apparatus of claim 1, wherein the connectivity check is a Simple Traversal of User Datagram Protocol through Network Address Translation (STUN) check.

3. The apparatus of claim 2, wherein the STUN check is performed during Interactive Connectivity Establishment (ICE) processing.

4. The apparatus of claim 2, wherein the plurality of potential configurations and selected configuration are predefined STUN attributes.

5. The apparatus of claim 1, wherein each of the plurality of potential configurations comprises a unique identifier.

6. The apparatus of claim 5, wherein the data representative of the selected configuration comprises the unique identifier of the selected configuration.

7. The apparatus of claim 1, wherein a predefined ordering relationship is employed for selecting alternatives of the plurality of potential configurations.

8. The apparatus of claim 1, wherein the streaming media client is further configured to communicate with a Simple Traversal of User Datagram Protocol through Network Address Translation (STUN) server to acquire a public Internet Protocol (IP) address; and
 wherein the connection request comprises the IP address acquired from the STUN server.

9. The apparatus of claim 1, wherein the connection request comprises a session version;
 wherein the data representative of a selected configuration comprises a session version for the selected configuration; and
 wherein the streaming media client is further configured to correlate the session version in the connection request with the session version for the selected configuration.

10. The apparatus of claim 1, wherein the plurality of potential configurations contain data representative of one of a group consisting of Internet Protocol (IP) address, security algorithm, keying material, transport protocol, a session identifier, media format and a media format parameter.

11. An apparatus, comprising:
 a transceiver configured to be coupled to a network; and
 a streaming media module in data communication with the transceiver;
 wherein the streaming media module is configured to receive a connection request from a device coupled to the network via the transceiver, the connection request comprising a plurality of potential configurations;
 wherein the streaming media module is configured to select one of the plurality of configurations for communicating with the device; and
 wherein the streaming media module is configured to perform a connectivity check with the device, the streaming media module sending data representative of the selected configuration to the device during the connectivity check;
 wherein the connection request is received from a connection server, the streaming media module is further configured to send an answer to the connection request to the connection server;
 wherein the connection server is a Session Initiation Protocol (SIP) compatible server;
 wherein the streaming media module determines from the SDP message that the device is Interactive Connectivity Establishment protocol compatible;
 wherein the data representative of a selected configuration is sent during a Simple Traversal of User Datagram Protocol through Network Address Translation (STUN) compatible connectivity check; and
 wherein the data representative of the selected configuration includes an Interactive Connectivity Exchange "ICE" u-frag attribute and an ICE-pwd attribute.

12. The apparatus of claim 11, wherein the data representative of a selected configuration comprises a session version for the selected configuration.

13. A method, comprising:
 gathering addresses;
 prioritizing addresses;
 sending an offer to initiate a streaming media session, the offer comprising a plurality of potential configurations;
 generating address pairs for the streaming media session;
 performing connectivity checks with the address pairs;
 receiving a selected configuration selected from the plurality of potential configurations for the streaming media session;
 wherein the selected configuration is received while performing the connectivity checks;
 wherein the connectivity request comprises a username fragment and a message integrity check;
 wherein the data representative of the selected configuration includes an Interactive Connectivity Exchange "ICE" u-frag attribute and an ICE-pwd attribute; and
 correlating an ICE u-frag attribute and an ICE-pwd attribute in the data representative of the selected configuration with the ICE u-frag attribute and an ICE-pwd attribute in the connectivity request.

14. The method according to claim 13, further comprising receiving an answer to the offer after performing the connectivity checks.

15. A method, comprising:
 receiving a connection request from a device, the connection request comprising a plurality of potential configurations;
 selecting one of the plurality of configurations for communicating with the device; and
 performing a connectivity check with the device, the performing a connectivity check comprises sending data representative of the selected configuration to the device during the connectivity check;
 wherein the connectively check is a Simple Traversal of User Datagram Protocol through Network Address Translation (STUN) compatible connectively check
 wherein the data representative of a selected configuration is sent during the STUN compatible connectivity check; and
 wherein the data representative of the selected configuration includes an Interactive Connectivity Exchange "ICE" u-frag attribute and an ICE-pwd attribute.

16. The method of claim 15, wherein the connection request is received from a connection server, the method further comprises sending an answer to the connection request to the connection server.

* * * * *